US009259667B2

(12) United States Patent
Roch et al.

(10) Patent No.: US 9,259,667 B2
(45) Date of Patent: *Feb. 16, 2016

(54) MODULAR HUMIDIFICATION-DEHUMIDIFICATION APPARATUS FOR CONCENTRATING SOLUTIONS

(71) Applicant: Saltworks Technologies Inc., Vancouver, British Columbia (CA)

(72) Inventors: Nicolas C. Roch, Burnaby (CA); Benjamin Stuart Sparrow, Vancouver (CA)

(73) Assignee: SALTWORKS TECHNOLOGIES INC., Vancouver, British Columbia (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/384,007

(22) PCT Filed: Apr. 18, 2013

(86) PCT No.: PCT/CA2013/050299
§ 371 (c)(1),
(2) Date: Sep. 9, 2014

(87) PCT Pub. No.: WO2013/159220
PCT Pub. Date: Oct. 31, 2013

(65) Prior Publication Data
US 2015/0047963 A1   Feb. 19, 2015

Related U.S. Application Data

(60) Provisional application No. 61/638,398, filed on Apr. 25, 2012.

(51) Int. Cl.
*B01D 5/00* (2006.01)
*B01D 3/00* (2006.01)
(Continued)

(52) U.S. Cl.
CPC ........ *B01D 5/006* (2013.01); *B01D 1/14* (2013.01); *B01D 1/26* (2013.01); *B01D 3/007* (2013.01); *B01D 5/0036* (2013.01); *C02F 1/10* (2013.01); *F25B 13/00* (2013.01); *Y02B 30/52* (2013.01)

(58) Field of Classification Search
None
See application file for complete search history.

(56) References Cited

U.S. PATENT DOCUMENTS 3,616,833 A   11/1971   Davies
8,317,992 B2 * 11/2012  Sparrow et al. ............... 204/633
(Continued)

FOREIGN PATENT DOCUMENTS

CN       1583582 A        2/2005
CN     101921036 A  *    12/2010
(Continued)

OTHER PUBLICATIONS

Sandeep Parekh, M.M. Farid, J.R. Selman, Said Al-hallaj. "Solar desalination with a humidification-dehumidification technique—a comprehensive technical review". Desalination, vol. 160, Issue 2. Jan. 15, 2004, pp. 167-186.*
(Continued)

*Primary Examiner* — Renee E Robinson
*Assistant Examiner* — Jonathan Miller
(74) *Attorney, Agent, or Firm* — Troutman Sanders LLP; Ryan A. Schneider; Benjamin C. Wiles

(57) ABSTRACT

A modular humidification-dehumidification (HDH) apparatus and system for concentrating a solution including a plurality of internal modules coupled to each other. The plurality of internal modules includes a humidification module and a dehumidification module in gas flow communication with the humidification module. The humidification module includes humidification media facilitating evaporation of liquid from the solution to gas as the solution passes through the humidification media thereby producing a concentrated solution and a humidified gas. The dehumidification module includes a condensing heat exchanger for condensing vapor from the humidified gas.

25 Claims, 4 Drawing Sheets

(51) Int. Cl.
  *C02F 1/10* (2006.01)
  *F25B 13/00* (2006.01)
  *B01D 1/14* (2006.01)
  *B01D 1/26* (2006.01)

(56) References Cited

U.S. PATENT DOCUMENTS

| | | | |
|---|---|---|---|
| 8,727,325 B2* | 5/2014 | Sparrow et al. | 261/140.1 |
| 2002/0166758 A1 | 11/2002 | Vinz | |
| 2004/0113291 A1 | 6/2004 | Klausner et al. | |
| 2005/0183440 A1* | 8/2005 | Holtzapple et al. | 62/333 |
| 2010/0051546 A1* | 3/2010 | Vuong et al. | 210/637 |
| 2011/0056822 A1* | 3/2011 | Elsharqawy et al. | 203/11 |

FOREIGN PATENT DOCUMENTS

| | | | |
|---|---|---|---|
| CN | 101973598 A | | 2/2011 |
| CN | 102381735 A | | 3/2012 |
| EP | 0897735 A1 | | 2/1999 |
| EP | 1770068 A2 | * | 4/2007 |
| WO | 2005075045 A1 | | 8/2005 |
| WO | WO 2005075045 A1 | * | 8/2005 |
| WO | WO 2007128062 A1 | * | 11/2007 |
| WO | 2012159203 A1 | | 11/2012 |

OTHER PUBLICATIONS

English Translation—WO 2005075045 A1.*
English Translation—CN 101921036 A.*
English Translation—EP 1770068 A2.*
The International Search Report and Written Opinion in related PCT Application PCT/CA2013/050299 mailed May 14, 2013.
Chinese Office Action for related Chinese Application No. 2013800095768 mailed Oct. 20, 2015.
Extended European Search Report for related European Application No. 13782320.9 mailed Nov. 19, 2015.

* cited by examiner

MODULAR HUMIDIFICATION-DEHUMIDIFICATION APPARATUS FOR CONCENTRATING SOLUTIONS

CROSS-REFERENCE TO RELATED APPLICATIONS

This application is a US National Stage of International Application No. PCT/CA2013/050299, filed 18 Apr. 2013, which claims the benefit of U.S. Provisional Patent Application No. 61/638,398, filed 25 Apr. 2012, each herein fully incorporated by reference.

TECHNICAL FIELD

The present disclosure is directed at a modular humidification-dehumidification (HDH) apparatus for concentrating solutions, such as saltwater. The present disclosure is also directed at a HDH system comprising a first effect modular HDH apparatus and a second effect modular HDH apparatus.

BACKGROUND

Waters contaminated with salt can be unusable or hazardous to the environment. For example, mines use freshwater and discharge tailings into ponds. Tailings water is commonly about 99.8% freshwater by mass, but is unusable due to low levels of salts, for example 0.1 to 0.2% by mass. Desalination is being increasingly used in both industries as regulations require treatment of impaired water. Desalination is also used in coastal regions to produce freshwater from seawater, with the more saline brine reject returned to the ocean. Reverse osmosis is the dominant desalination technology, but faces osmotic pressure and fouling limits that reduce production of freshwater per unit of input water. Conventional thermal desalination systems do not experience osmotic pressure limits, but instead face heat transfer surface fouling issues at higher temperatures due to the inverse temperature solubility of calcium sulfate and carbonates.

In humidification-dehumidification (HDH) desalination systems an air stream is humidified by warm saltwater, with the air stream having a wet bulb temperature lower than the warm saltwater temperature. The warm saltwater drips through fill material to promote heat and mass transfer from the warm saltwater to the air stream. The humidified air stream is then cooled by a heat exchanger surface that is colder than the wet bulb temperature of the humidified air. As the humidified air is cooled, the air's ability to hold vapour decreases and moisture condenses on the cooler heat exchanger tubes. A cool liquid or evaporating refrigerant flows internal to the heat exchanger tubes.

Air based HDH systems offer certain advantages as well as drawbacks over conventional thermal desalination systems. One advantage is that HDH systems operate at lower temperature, for example less than 80° C., reducing fouling and enabling the use of waste heat to run the process. A lower operation temperature also allows the HDH apparatus to be constructed from less expensive and corrosion resilient engineered plastics such as high density polyethylene (HDPE) or polyvinyl chloride (PVC), which are less prone to fouling. One of the drawbacks of HDH systems is that the footprint of a conventional HDH apparatus is generally higher than a conventional thermal desalination apparatus which employs higher pressure and temperature steam with a lower specific volume. Since a conventional HDH apparatus is operated at a lower temperature, the water vapour has a higher specific volume necessitating more vapour space, hence a larger footprint. It would therefore be of benefit to provide a HDH system that provides such vapour space at a low cost. Lower cost can be achieved through modularization, improved repeatability, economies of scale, and reduction of site work.

SUMMARY

According to one aspect of the invention, there is provided a modular humidification-dehumidification (HDH) apparatus for concentrating a solution. The apparatus comprises a plurality of internal modules coupled to each other. The plurality of internal modules comprise a humidification module and a dehumidification module in gas flow communication with the humidification module. The humidification module comprises humidification media facilitating evaporation of liquid from the solution to gas as the solution passes through the humidification media thereby producing a concentrated solution and a humidified gas. The dehumidification module comprises a condensing heat exchanger for condensing vapour from the humidified gas.

The modular HDH apparatus may further comprise a fan for generating gas flow through the plurality of internal modules. The fan may be configured to generate gas flow in one direction through the plurality of internal modules and to generate gas flow in an opposite direction through the plurality of internal modules. The plurality of internal modules may further comprise a fan module with the fan positioned in the fan module.

The modular HDH apparatus may further comprise a plurality of seals with each seal positioned between adjacent internal modules to fluidly seal the internal modules to each other. The plurality of seals may be gas inflatable seals.

The modular HDH apparatus may further comprise an air inlet vent for controlled input of air into the plurality of internal modules and an air outlet vent for controlled release of air from the plurality of internal modules.

The modular HDH apparatus may further comprise a heat pump circuit comprising the condensing heat exchanger, a compressor, a condenser, and an expansion device in fluid flow communication for flow of a refrigerant therethrough. The condensing heat exchanger may be configured to transfer heat generated by condensation of vapour from the humidified gas on an external surface of the condensing heat exchanger to the refrigerant flowing within the condensing heat exchanger to evaporate the refrigerant. The compressor may be configured to compress the evaporated refrigerant. The condenser may be configured to condense the compressed refrigerant and transfer the heat of condensation of the refrigerant to the solution before the solution passes through the humidification media. The expansion device may be configured to expand the compressed refrigerant before the refrigerant enters the condensing heat exchanger.

The modular HDH apparatus may comprise two or more humidification modules and two or more dehumidification modules, wherein one of the humidification modules and one of the dehumidification modules make up a first effect and another of the humidification modules and another of the dehumidification modules make up a second effect. The condensing heat exchanger of the dehumidification module of the first effect may be configured to receive a second effect solution such that the second effect solution flows inside the condensing heat exchanger of the dehumidification module of the first effect before the second effect solution passes through the humidification media of the humidification module of the second effect and is heated by heat generated from condensation of vapour from the humidified gas on an external surface of the condensing heat exchanger of the dehumidification module of the first effect. The condensing heat exchanger of the dehumidification module of the second effect may be part of a heat pump circuit, the heat pump circuit further comprising a compressor, a condenser, and an expansion device in fluid flow communication with the condensing heat exchanger of the dehumidification module of the second effect for flow of a refrigerant therethrough. The condensing heat exchanger of the dehumidification module of the second effect may be configured to transfer heat generated by condensation of vapour from the humidified gas on an external surface of the condensing heat exchanger of the dehumidification module of the second effect to the refrigerant flowing within the condensing heat exchanger of the dehumidification module of the second effect to evaporate the refrigerant. The compressor may be configured to compress the evaporated refrigerant. The condenser may be configured to condense the compressed refrigerant and transfer the heat of condensation of the refrigerant to a first effect solution before the first effect solution passes through the humidification media of the humidification module of the first effect. The expansion device may be configured to expand the compressed refrigerant before the refrigerant enters the condensing heat exchanger of the dehumidification module of the second effect.

The modular HDH apparatus may comprise more than two effects and each effect may comprise one of the humidification modules in gas flow communication with one of the dehumidification modules. The condensing heat exchanger of the dehumidification module of a higher temperature effect may be configured to receive a solution to be concentrated from a lower temperature effect such that the solution to be concentrated flows inside the condensing heat exchanger of the dehumidification module of the higher temperature effect before the solution to be concentrated passes through the humidification media of the humidification module of the lower temperature effect.

According to another aspect of the invention, there is provided a modular humidification-dehumidification (HDH) apparatus for concentrating a solution. The apparatus comprises a plurality of internal modules coupled to each other. Two or more of the internal modules are HDH modules and each HDH module comprises: humidification media facilitating evaporation of liquid from the solution to gas as the solution passes through the humidification media thereby producing a concentrated solution and a humidified gas; and a condensing heat exchanger in gas flow communication with the humidification media for condensing vapour from the humidified gas thereby producing a dehumidified gas.

The modular HDH apparatus may further comprise a fan for generating gas flow through the plurality of internal modules. Alternatively, each HDH module may further comprise a fan for generating gas flow through the HDH module. The fan may be configured to generate gas flow in one direction through the plurality of internal modules and to generate gas flow in an opposite direction through the plurality of internal modules.

The HDH modules may be in gas flow communication with each other such that the dehumidified gas from one of the HDH modules flows through the humidification media of another of the HDH modules. The modular HDH apparatus may further comprise a plurality of seals with each seal positioned between adjacent internal modules to fluidly seal the internal modules to each other. The plurality of seals may be gas inflatable seals. The modular HDH apparatus may further comprise an air inlet vent for controlled input of air into the plurality of internal modules and an air outlet vent for controlled release of air from the plurality of internal modules.

One or more of the HDH modules may be open to the atmosphere such that atmospheric air enters the humidification media and the dehumidified gas is released to the atmosphere.

The modular HDH apparatus may further comprise a heat pump circuit comprising the condensing heat exchanger, a compressor, a condenser, and an expansion device in fluid flow communication for flow of a refrigerant therethrough. The condensing heat exchanger may be configured to transfer heat generated by condensation of vapour from the humidified gas on an external surface of the condensing heat exchanger to the refrigerant flowing within the condensing heat exchanger to evaporate the refrigerant. The compressor may be configured to compress the evaporated refrigerant, the condenser may be configured to condense the compressed refrigerant and transfer the heat of condensation of the refrigerant to the solution before the solution passes through the humidification media. The expansion device may be configured to expand the compressed refrigerant before the refrigerant enters the condensing heat exchanger.

The modular HDH apparatus may comprise a first effect HDH module and a second effect HDH module. The condensing heat exchanger of the first effect HDH module may be configured to receive a second effect solution such that the second effect solution flows inside the condensing heat exchanger of the first effect HDH module before the second effect solution passes through the humidification media of the second effect HDH module and is heated by heat generated from condensation of vapour from the humidified gas on an external surface of the condensing heat exchanger of the first effect HDH module. The condensing heat exchanger of the second effect HDH module may be part of a heat pump circuit, the heat pump circuit further comprising a compressor, a condenser, and an expansion device in fluid flow communication with the condensing heat exchanger of the second effect HDH module for flow of a refrigerant therethrough. The condensing heat exchanger of the second effect HDH module may be configured to transfer heat generated by condensation of vapour from the humidified gas on an external surface of the condensing heat exchanger of the second effect HDH module to the refrigerant flowing within the condensing heat exchanger of the second effect HDH module to evaporate the refrigerant. The compressor may be configured to compress the evaporated refrigerant. The condenser may be configured to condense the compressed refrigerant and transfer the heat of condensation of the refrigerant to a first effect solution before the first effect solution passes through the humidification media of the first effect HDH module. The expansion device may be configured to expand the compressed refrigerant before the refrigerant enters the condensing heat exchanger of the second effect HDH module.

The modular HDH apparatus may comprise more than two HDH modules with each HDH module having a different temperature effect. The condensing heat exchanger of a higher temperature effect HDH module may be configured to receive a solution to be concentrated in a lower temperature effect HDH module such that the solution to be concentrated flows inside the condensing heat exchanger of the higher temperature effect HDH module before the solution to be concentrated passes through the humidification media of the lower temperature effect HDH module.

The modular HDH apparatus may further comprise a frame housing the plurality of internal modules. The plurality of internal modules may be compressively coupled to each other within the frame. The modular HDH apparatus may further comprise a compression device for compressing the frame. The internal modules may be individually removable from the frame.

According to another aspect of the invention, there is provided a modular humidification-dehumidification (HDH) apparatus for desalinating a saltwater solution comprising a frame, a plurality of internal modules compressively coupled and in gas flow communication with each other within the frame, and a fan for generating air flow through the plurality of internal modules. The plurality of internal modules comprise two or more humidification modules and two or more dehumidification modules wherein the humidification modules and the dehumidification modules are alternating within the frame. Each of the humidification modules comprises humidification media facilitating evaporation of liquid from the saltwater solution to air as the saltwater solution passes through the humidification media thereby producing a concentrated saltwater solution and humidified air. Each of the dehumidification modules comprises a condensing heat exchanger for condensing vapour from the humidified air.

The modular HDH apparatus may further comprise a compression device for compressing the frame. The internal modules may be individually removable from the frame. The modular HDH apparatus may further comprise a plurality of seals with each seal positioned between adjacent internal modules to fluidly seal the internal modules to each other. The plurality of seals may be gas inflatable seals. The modular HDH apparatus may further comprise an air inlet louver for controlled input of external air into the plurality of internal modules and an air outlet louver for controlled release of air from the plurality of internal modules.

The modular HDH apparatus may further comprise a heat pump circuit comprising the condensing heat exchanger, a compressor, a condenser, and an expansion device in fluid flow communication for flow of a refrigerant therethrough. The condensing heat exchanger may be configured to transfer heat generated by condensation of vapour from the humidified air on an external surface of the condensing heat exchanger to the refrigerant flowing within the condensing heat exchanger to evaporate the refrigerant. The compressor may be configured to compress the evaporated refrigerant. The condenser may be configured to condense the compressed refrigerant and transfer the heat of condensation of the refrigerant to the saltwater solution before the saltwater solution passes through the humidification media. The expansion device may be configured to expand the compressed refrigerant before the refrigerant enters the condensing heat exchanger.

According to another aspect of the invention, there is provided a HDH system for concentrating a solution comprising a first effect modular HDH apparatus and a second effect modular HDH apparatus. The first effect modular HDH apparatus and the second effect modular apparatus each comprise the modular HDH apparatus of the present invention. The first effect modular HDH apparatus and the second effect modular HDH apparatus are thermally coupled to each other as a result of at least one of:

(i) the condensing heat exchanger of the first effect modular HDH apparatus being configured to receive a second effect solution such that the second effect solution flows inside the condensing heat exchanger of the first effect modular HDH apparatus before the second effect solution passes through the humidification media of the second effect modular HDH apparatus, the second effect solution being heated by heat generated from condensation of vapour from the humidified gas on an external surface of the condensing heat exchanger of the first effect modular HDH apparatus;

(ii) the condensing heat exchanger of the second effect modular HDH apparatus being part of a heat pump circuit, the heat pump circuit further comprising a compressor, a condenser, and an expansion device in fluid flow communication with the condensing heat exchanger of the second effect modular HDH apparatus for flow of a refrigerant therethrough, wherein the condensing heat exchanger of the second effect modular HDH apparatus is configured to transfer heat generated by condensation of vapour from the humidified gas on an external surface of the condensing heat exchanger of the second effect modular HDH apparatus to the refrigerant flowing within the condensing heat exchanger of the second effect modular HDH apparatus to evaporate the refrigerant, the compressor is configured to compress the evaporated refrigerant, the condenser is configured to condense the compressed refrigerant and transfer the heat of condensation of the refrigerant to a first effect solution before the first effect solution passes through the humidification media of the first effect modular HDH apparatus, and the expansion device is configured to expand the compressed refrigerant before the refrigerant enters the condensing heat exchanger of the second effect modular HDH apparatus.

The system may include more than two effect modular HDH apparatus and the condensing heat exchanger of a higher temperature effect modular HDH apparatus may be configured to receive a solution to be concentrated in a lower temperature effect modular HDH apparatus such that the solution to be concentrated flows inside the condensing heat exchanger of the higher temperature effect modular HDH apparatus before the solution to be concentrated passes through the humidification media of the lower temperature effect modular HDH apparatus.

According to another aspect of the invention, there is provided a HDH system for desalinating a saltwater solution comprising a first effect modular HDH apparatus, a second effect modular HDH apparatus and a heat pump circuit. The first effect modular HDH apparatus comprises a first frame, a plurality of first effect internal modules compressively coupled and in gas flow communication with each other within the first frame, and a first fan for generating air flow through the plurality of first effect internal modules. The plurality of first effect internal modules comprise two or more first effect humidification modules and two or more first effect dehumidification module, the first effect humidification modules and the first effect dehumidification modules alternating within the first frame. Each of the first effect humidification modules comprises first effect humidification media facilitating evaporation of liquid from a first effect saltwater solution to air as the first effect saltwater solution passes through the first effect humidification media thereby producing a concentrated first effect saltwater solution and a first effect humidified air. Each of the first effect dehumidification modules comprises a first effect condensing heat exchanger for condensing vapour from the first effect humidified air. The second effect modular HDH apparatus comprises a second frame, a plurality of second effect internal modules compressively coupled and in gas flow communication with each other within the second frame, and a second fan for generating air flow through the plurality of second effect internal modules. The plurality of second effect internal modules comprises two or more second effect humidification modules and two or more second effect dehumidification modules, the second effect humidification modules and the second effect dehumidification modules alternating within the second frame. Each of the second effect humidification modules comprises second effect humidification media facilitating evaporation of liquid from a second effect saltwater solution to air as the second effect saltwater solution passes through the second effect humidification media thereby producing a concentrated second effect saltwater solution and a second effect humidified air. Each of the second effect dehumidification modules comprises a second effect condensing heat exchanger for condensing vapour from the second effect humidified air. The heat pump circuit comprises the second effect condensing heat exchanger, a compressor, a condenser, and an expansion device in fluid flow communication for flow of a refrigerant therethrough. The second effect condensing heat exchanger is configured to transfer heat generated by condensation of vapour from the second effect humidified air on an external surface of the second effect condensing heat exchanger to the refrigerant flowing within the second effect condensing heat exchanger to evaporate the refrigerant, the compressor is configured to compress the evaporated refrigerant, the condenser is configured to condense the compressed refrigerant and transfer the heat of condensation of the refrigerant to the first effect saltwater solution before the first effect saltwater solution passes through the first effect humidification media, and the expansion device is configured to expand the compressed refrigerant before the refrigerant enters the second effect condensing heat exchanger. The first effect condensing heat exchanger is configured to receive the second effect saltwater solution such that the second effect saltwater solution flows inside the first effect condensing heat exchanger before the second effect saltwater solution passes through the second effect humidification media, the second effect saltwater solution being heated by heat generated from condensation of vapour from the first effect humidified gas on an external surface of the first effect condensing heat exchanger.

The plurality of first effect internal modules may further comprise a first effect fan module and the first fan may be positioned within the first effect fan module. The plurality of second effect internal modules may further comprise a second effect fan module and the second fan may be positioned within the second effect fan module. Alternatively, the first fan may be positioned in the first effect dehumidification module and/or the second fan may be positioned in the second effect dehumidification module.

The system may further comprise a first compression device for compressing the plurality of first effect internal modules within the first frame. The system may further comprise a second compression device for compressing the plurality of second effect internal modules within the second frame. The first effect internal modules may be individually removable from the first frame. The second effect internal modules may be individually removable from the second frame.

The system may further comprise a plurality of seals with each seal positioned between adjacent internal modules to fluidly seal the internal modules to each other. The plurality of seals may be gas inflatable seals.

The first effect modular HDH apparatus may further comprise a first air inlet louver for controlled input of external air into the plurality of first effect internal modules and a first air outlet louver for controlled release of air from the plurality of first effect internal modules. The second effect modular HDH apparatus may further comprises a second air inlet louver for controlled input of external air into the plurality of second effect internal modules and a second air outlet louver for controlled release of air from the plurality of second effect internal modules.

BRIEF DESCRIPTION OF THE DRAWINGS

In the accompanying drawings, which illustrate one or more exemplary embodiments.

DETAILED DESCRIPTION

Directional terms such as "top", "bottom", "upwards", "downwards", "vertically" and "laterally" are used in the following description for the purpose of providing relative reference only, and are not intended to suggest any limitations on how any article is to be positioned during use, or to be mounted in an assembly or relative to an environment.

The embodiments described herein are directed at a modular humidification-dehumidification (HDH) apparatus and a HDH system comprising two or more modular HDH apparatus which are thermally coupled to each other. The modular HDH apparatus comprises a plurality of internal modules which are coupled to each other. The modular HDH apparatus and HDH system disclosed herein are generally used for desalinating a saltwater, however, the modular HDH apparatus and HDH system may be used to concentrate any solution.

In one embodiment, the plurality of internal modules includes a humidification module and a dehumidification module. The humidification module includes humidification media and the solution to be concentrated is passed through the humidification media and liquid, such as water, evaporates to gas flowing through the humidification media to produced humidified gas; the solution is therefore concentrated and may be collected and removed from the apparatus or further concentrated. The dehumidification module includes a condensing heat exchanger and the humidified gas from the humidification modules flows into the dehumidification module and passes over the heat exchanger. Vapour in the humidified gas condenses on the surface of the heat exchanger and can be collected. The resulting dehumidified gas may be directed into the same or a another humidification module in the modular apparatus and flows through the humidification media to be humidified again; the gas is accordingly continuously humidified and dehumidified as it passes through the internal modules of the modular HDH apparatus. Alternatively, the dehumidified gas may be exhausted to the atmosphere. In an alternative embodiment, the humidification media and the condensing heat exchanger are contained in a HDH module and the modular HDH apparatus may include two or more of the HDH modules.

The embodiments described herein are generally directed to the gas being air, however other gases may be used, for example methane, helium, hydrogen, or nitrogen with differing heat capacities that will provided different thermal and capacity performance. The apparatus may operate near atmospheric pressure and temperature, or slightly above or below, enabling construction of parts from plastics as opposed to more expensive corrosion resistant steels. Materials of construction such as polyethylene or polypropylene may be used for their smooth surfaces and reduced likelihood of salt adhesion.

Figure 1A:
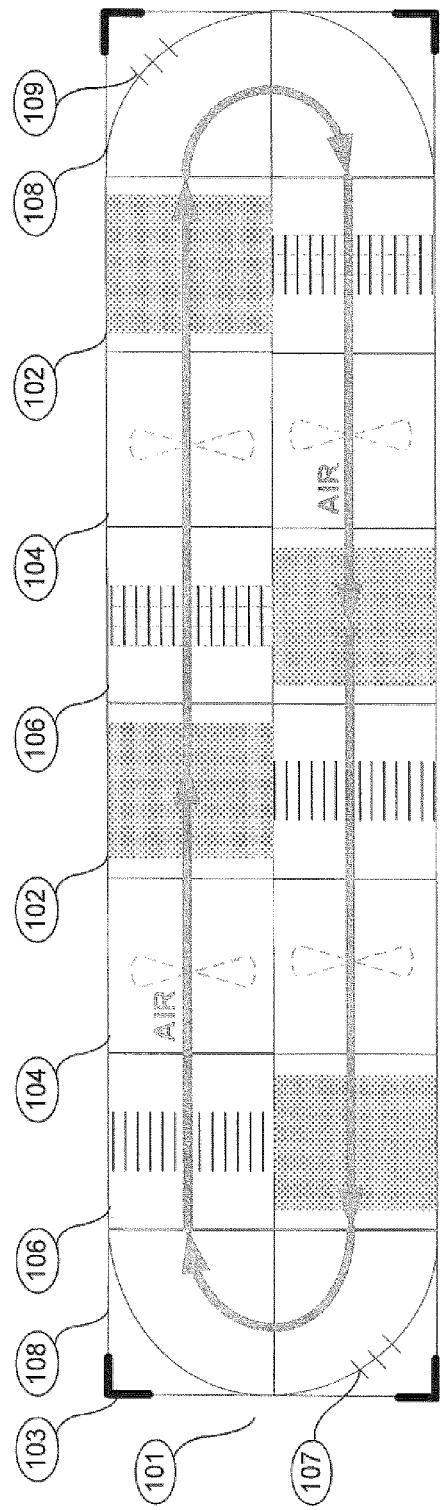
FIG. 1a is a top schematic view and FIG. 1b is a side schematic view of a modular HDH apparatus including internal modules positioned within a frame according to an embodiment.
Figure 1B:
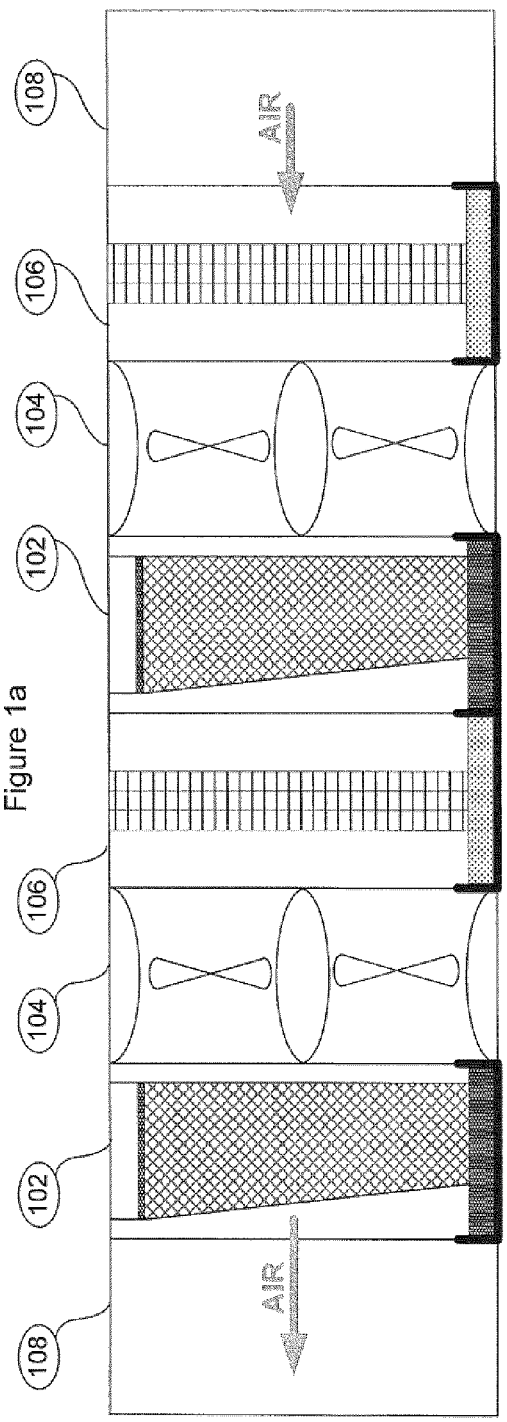
Figure 2:
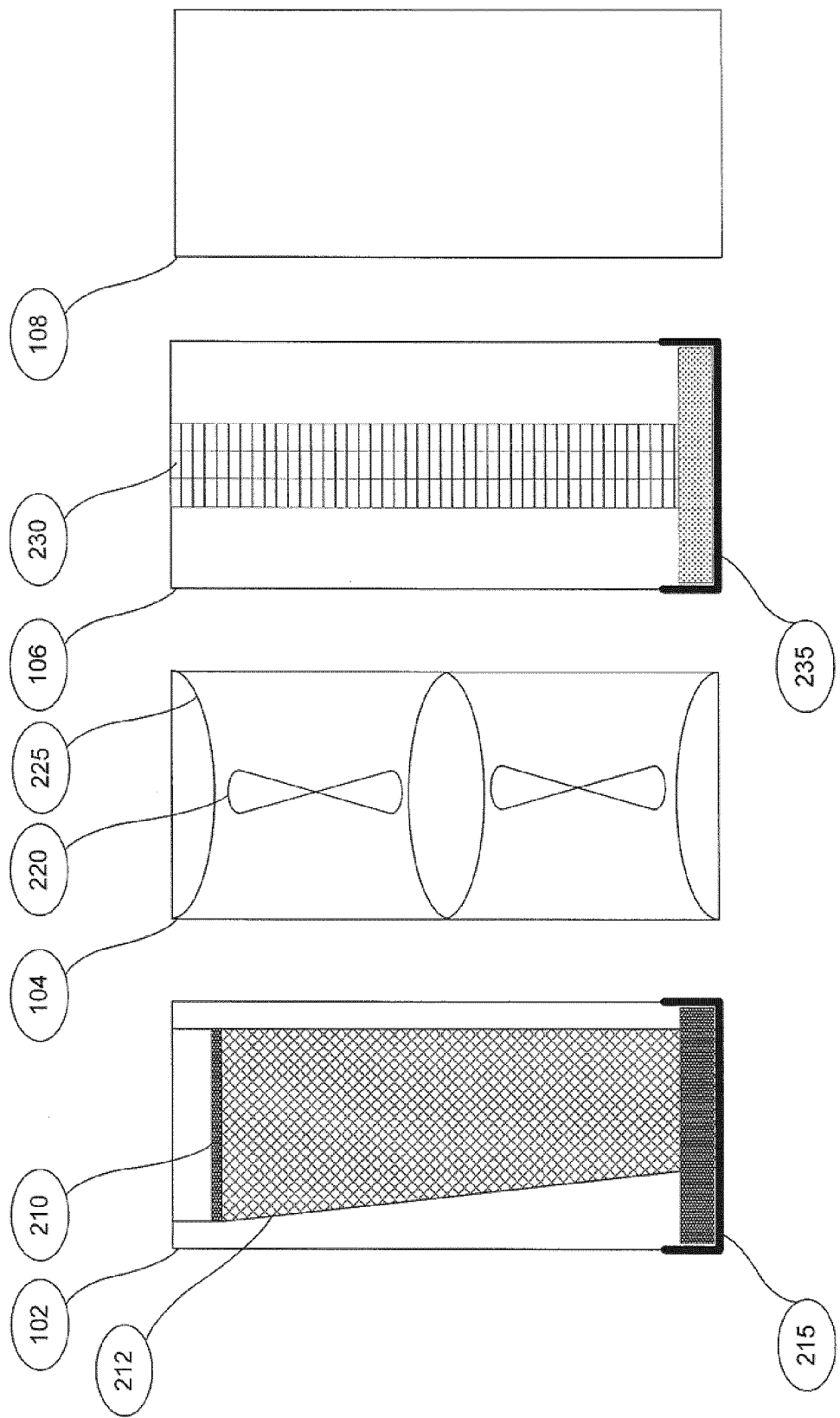
FIG. 2 is a side schematic view of the internal modules of the modular HDH apparatus.

Referring now to FIGS. 1a, 1b and 2 there is shown an embodiment of a modular HDH apparatus 101 comprising a plurality of internal modules coupled together and held in position by frame 103. Frame 103 may be configured to compress the internal modules together so that they are compressively coupled to each other. The modular apparatus 101 of the embodiment shown in FIGS. 1a and 1b includes two adjacent rows of internal modules positioned within the frame 103. The internal modules can be made up of five different types of modules as follows:

Humidification module 102 comprises a distribution header 210, humidification media 212, and basin 215. The humidification media 212 is any media or packing that facilitates evaporation of water from the saltwater being desalinated to air passing through the media, and may include, but is not limited to, cooling tower splash fill or film fill packing.

Fan module 104 comprises one or more fans 220 housed inside a fan casing 225. The fan module 104 may optionally include additional equipment such as heat pump machinery as described below. The heat pump machinery is typically positioned outside of the fan casing 225 and thus out of the air stream. The fans 220 generate air flow through the internal modules.

Dehumidification module 106 comprises a condensing heat exchanger, such as a dehumidifying radiator 230 and a freshwater basin 235. The condensing heat exchanger 230 may be an air finned heat exchanger as are known in the art.

Transition module 108 comprises an empty module or duct bridging one module to another allowing flow of air therethrough. The transition module 108 may turn the direction of air flow and/or make up lateral space in the frame 103. The transition module 108 may include exhaust vents or louvers 109 and air intake vents or louvers 107 to exhaust and intake air respectively.

Utility module (not shown) comprises a module housing utilities for nearby modules for example, but not limited to, AC and/or DC power service, instrumentation and controls interface or Programmable Logic Controller (PLC), compressed air, heat recovery heat exchangers, and wash water.

The modules 102, 104, 106, and 108 may be constructed from insulated panels to minimize heat loss to the atmosphere. The insulated panels may have a plastic skin, for example, but not limited to high density polyethylene (HDPE) or polyvinyl chloride (PVC) which are corrosion resistance and minimize fouling caused by salts in the saltwater.

In the embodiment shown in FIGS. 1a and 1b, the dehumidification module 106 is positioned on one side of the humidification module 102 with the fan module 104 positioned on the other side of the humidification module 102. A transition module 108 is positioned at either end of each row of internal modules in the HDH apparatus 101 to divert the flow of air in a closed loop. Air normally circulates in one direction through all the internal modules in the HDH apparatus 101. The air direction may be periodically reversed by reversing fan direction; this may beneficially clean the humidification media 212 and the leading edge surfaces of the condensing heat exchanger 230 by exposing them to alternating wet/dry zones. Air is taken in and exhausted by air inlet vents (louvers) 107 and air exhaust vents (louvers) 109 respectively, which facilitate temperature regulation and allow discharge of unwanted gases. The apparatus 101 is therefore an adjustable semi to full closed loop modular HDH apparatus, which enables greater capacity control independent of external environmental conditions. In the closed loop system air circulates through the humidification and dehumidification modules 102, 106 and circulation of the saturated air stream prevents heat loss to atmosphere and enables operation at an elevated temperature. In cold climates, closed loop apparatus operating at an elevated internal temperature will have higher capacity than an open apparatus operating at the colder external temperature. Insulating the apparatus will further reduce heat losses. The decision whether to operate in an open mode, closed mode, or partially closed mode may depend on the outside air temperature, outside air relative humidity, and the design temperature for the fully closed apparatus.

In alternative embodiments, the arrangement of the internal modules in the modular HDH apparatus may differ to that shown in FIGS. 1a and 1b. For example, there may be more or less fan modules 104 depending on the required flow of gas (air) through the apparatus. Alternatively, the fan module 104 need not be present and the fans 220 may instead be positioned in the humidification module 102 and/or the dehumidification module 106 or at one or both ends of the modular apparatus. Furthermore, there may be more or less transition modules 108 and the transition modules 108 need not be present at all in the HDH apparatus. The internal modules may be provided in a single row of modules with air input at one end and air output at the other end, and an air duct may be provided for flow of air between the air output and the air input. Alternatively, there may be more than two rows of internal modules in the frame 103 with each row being in gas flow communication with the other rows for flow of a gas (air) throughout the modular HDH apparatus. In further alternative embodiments, the modules may be open to the atmosphere and not in a closed loop arrangement, such that atmospheric air enters the humidification module and is humidified and the humidified air flows from the humidification module to the dehumidification module and is dehumidified before being released to the atmosphere. The innovative aspects of the invention apply equally in embodiments such as these.

In use, saltwater to be desalinated is heated to a temperature higher than the wet bulb temperature of the air passing through the humidification media 212. The warm saltwater to be desalinated is fed to the distribution header 210 of the humidification module 102 and drips down through the humidification media 212. Water is evaporated and heat is transferred from the saltwater to the air to produce warm moist (humidified) air. The rate of evaporation is roughly proportional to the temperature difference between the warm saltwater to be desalinated and the wet bulb temperature of the air. Vaporization of water cools and concentrates the saltwater, and the cooled concentrated saltwater collects in basin 215. The warm humidified air flows into the dehumidification module 106 and passes over the tubes of the heat exchanger 230. Liquid inside the tubes is at a temperature lower than the wet bulb temperature of the warm humidified air plus an additional margin to allow for heat transfer resistance. As a result, water condenses from the warm humidified air as it contacts the surface of the tubes and the latent heat of condensation is transferred to the liquid inside the tubes. The condensed water collects in freshwater basin 235. The cooled dehumidified air is circulated through to the next humidification module 102 by the fan(s) 220 in the fan module 104. The end products from the process are therefore concentrated saltwater collected in the basins 215 of the humidification modules 102 and freshwater collected in the freshwater basins 235 of the dehumidification modules 106. The concentrated saltwater may be pooled together, warmed and recirculated through the humidification modules 102 for further concentration or removed from the apparatus for disposal or further processing, for example, salts may be precipitated in a precipitation vessel (not shown). The freshwater may be pooled together and utilized by the apparatus, for example for cleaning pipes and parts of the apparatus, or may be removed.

In an alternative embodiment (not shown), heat pump machinery including a compressor, a condenser and an expansion device may be provided in order to upgrade a portion of the latent heat of condensation resulting from condensation of vapour on the surface of tubes of the heat exchanger 230. The upgraded heat may be used to heat the saltwater to be desalinated before the saltwater passes through the humidification media 212. The heat pump machinery may be positioned in the fan module 104 outside the fan casing 225 and therefore out of the air stream flowing through the fan module 104. The heat pump machinery forms part of a heat pump circuit which also includes the heat exchanger 230. The condenser, compressor, expansion device and heat exchanger 230 of the heat pump circuit are in fluid flow communication with each other for flow of a refrigerant therethrough. In use, the refrigerant passes through the inside of the tubes of the heat exchanger 230 where the latent heat of condensation is transferred across the tubes to evaporate the refrigerant. The evaporated refrigerant is then compressed by the compressor in order to upgrade the heat captured and the evaporated refrigerant is discharged at a high pressure and temperature into the condenser. Saltwater to be desalinated passes through the condenser and the condenser condenses the compressed refrigerant and transfers the heat of condensation of the refrigerant to the saltwater to heat the saltwater before it passes through the humidification media 212. The compressed refrigerant is expanded and throttled to a lower pressure by the expansion device and enters the inside of the tubes of the heat exchanger 230 to be evaporated again. The requirement for low grade heat energy is beneficially reduced or removed completely. The heat pump requires higher grade mechanical energy to drive the compressor, however, heat pumps provide a coefficient of performance (COP) effect, resulting in a COP multiple of units heat energy upgraded per unit of mechanical energy used to drive the heat pump compressor. For example, with heat pump COP of three: three units of heat energy will be upgraded for each unit of mechanical energy input to the compressor resulting in a total of four units of heat energy being added to the saltwater (three units from the evaporator and one unit from the compressor). In sum, a smaller portion of high grade energy is used by the heat pump to recycle and upgrade heat content from the warm moist humidified air, thereby reducing or removing the need for an external heat supply.

Figure 4:
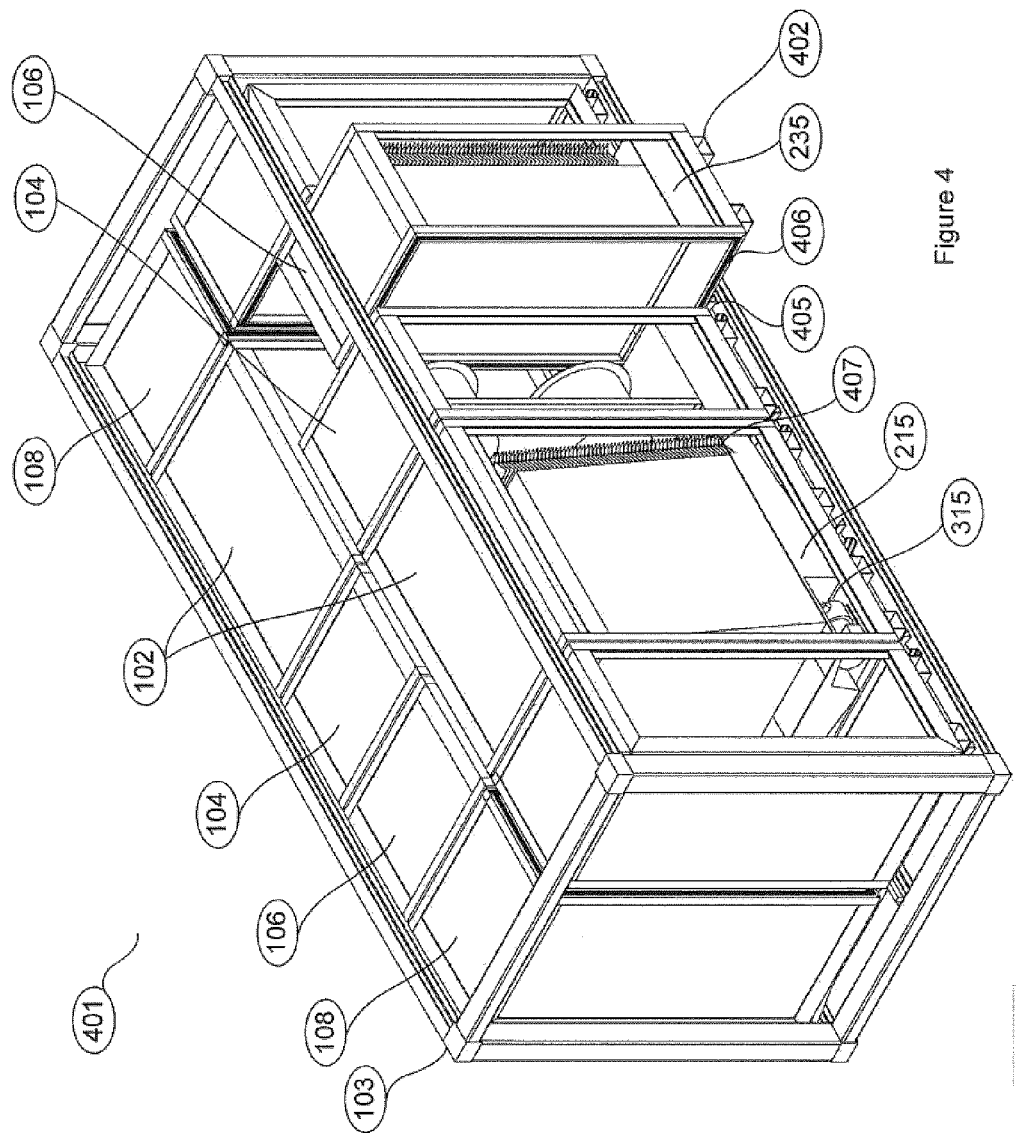
FIG. 4 is a perspective view of an alternative embodiment of the modular HDH apparatus.

Referring now to FIG. 4 there is shown an alternative embodiment of a modular HDH apparatus 401 including two humidification modules 102, two dehumidification modules 104, two fan modules 106, and four transition modules 108 assembled in frame 103. The apparatus 401 has two rows of modules with one of the fan modules 104 positioned between one of the humidification modules 102 and one of the dehumidification modules 106 in each row. A transition module 108 is positioned at either end of each row for directing the air flow around the corner and into the adjacent row. Air normally circulates in one direction around the modular HDH apparatus 401 moving between alternatively positioned humidification modules 102 and dehumidification modules 106 which are in air flow communication with each other, such that air exiting each of the humidification modules 102 is received by one of the dehumidification modules 106 and air exiting each of the dehumidification modules 106 is received by one of the humidification modules 102. The air direction may be periodically reversed by reversing fan direction; this may beneficially clean the humidification media 212 and the leading edge surfaces of the condensing heat exchanger 230 by exposing them to alternating wet/dry zones. The frame 103 may have substantially the same dimensions and structural rating as intermodal shipping containers such that the assembled modular HDH apparatus 401 can be transported using common infrastructure and can stack up to nine or more modular HDH apparatuses high in order to reduce footprint. In alternative embodiments, other transportable and stackable dimensions may be employed and the number and make up of internal modules in the modular HDH apparatus may vary. In further alternative embodiments, the frame 103 need not be present and the internal modules may be fastened or connected to each other to provide the modular HDH apparatus. The modular HDH apparatus may have substantially the same dimensions and structural rating as intermodal shipping containers. Alternatively, the internal modules may be connected or fastened together to provide a large module including multiple internal modules and the large module may be loaded into a frame, such as the frame 103 shown in FIG. 4.

Each of the internal modules 102, 104, 106, 108 can be removed from the modular apparatus for cleaning, maintenance or repair, and in FIG. 4, one of the dehumidification modules 106 is shown partially removed. The internal modules 102, 104, 106, 108 include a pair of forklift slots 402, which together with guide rails 405 on the frame 103 assist with module installation and removal. Alternative means for aiding removal and installation of the internal modules may be provided as would be known to a person of skill in the art. The removed module may be replaced with a transition module 108 so that the apparatus can continue to operate to desalinate water during maintenance of the module, albeit at a reduced capacity. A seal 406 is provided between individual modules, such that when the internal modules 102, 104, 106, 108 are compressed, an air tight seal is formed. Seals 406 may include inflatable air or hydraulic seals as are known in the art that provide compression force without moving the module. Alternatively, a neoprene, buna-n, or equivalent gasket may be used as seal 406. The internal modules 102, 104, 106, 108 may be compressed against one another inside the frame 103 through the use of compression bolts or turn buckles (not shown) on the outside of frame 103 as is known to those skilled in the art.

The humidification module 102 of the modular HDH apparatus 401 shown in FIG. 4 is about twice the width of the other modules. The humidification media 212 of the humidification module 102 generally requires more volume than the heat exchanger 230 of the dehumidification module 106, hence the double width of the humidification module 102, however in alternative embodiments, the width of the humidification module 102 may be the same or less than the dehumidification module 106. The humidification module 102 includes demisters 407 in the upstream air flow path of the humidification media 212 to remove water droplets which may remain entrained in the air stream following the dehumidification stage. A saltwater pump 315 can be integrated into the basin 215 of the humidification module 102 for pumping input saltwater to be desalinated into the distribution header 210 of the humidification module 102. The pump 315 is integrated into the basin 215 in order to keep all machinery inside the edges of the module; however in alternative embodiments pump 315 may be positioned elsewhere within the apparatus. In an alternative embodiment (not shown) the fan module 104 and dehumidification module 106 may be integrated into a single double wide module.

In an alternative embodiment (not shown), the humidification media 212 and heat exchanger 230 are included in a HDH module and two or more HDH modules make up the HDH modular apparatus. Gas flows through the HDH module such that humidified gas passes from the humidification media 212 to the heat exchanger 230. The HDH module may also include one or more fans 220 for generating gas flow through the HDH module and other equipment for running or maintenance of the HDH module, for example, but not limited to, AC and/or DC power service, instrumentation and controls interface or Programmable Logic Controller (PLC), compressed air, heat recovery heat exchangers, and wash water. The HDH modular apparatus may be a closed system with the HDH modules in gas flow communication with each other. Alternatively, one or more of the HDH modules may be open to the atmosphere such that atmospheric air enters the humidification media and the dehumidified gas is released to the atmosphere.

Figure 3:
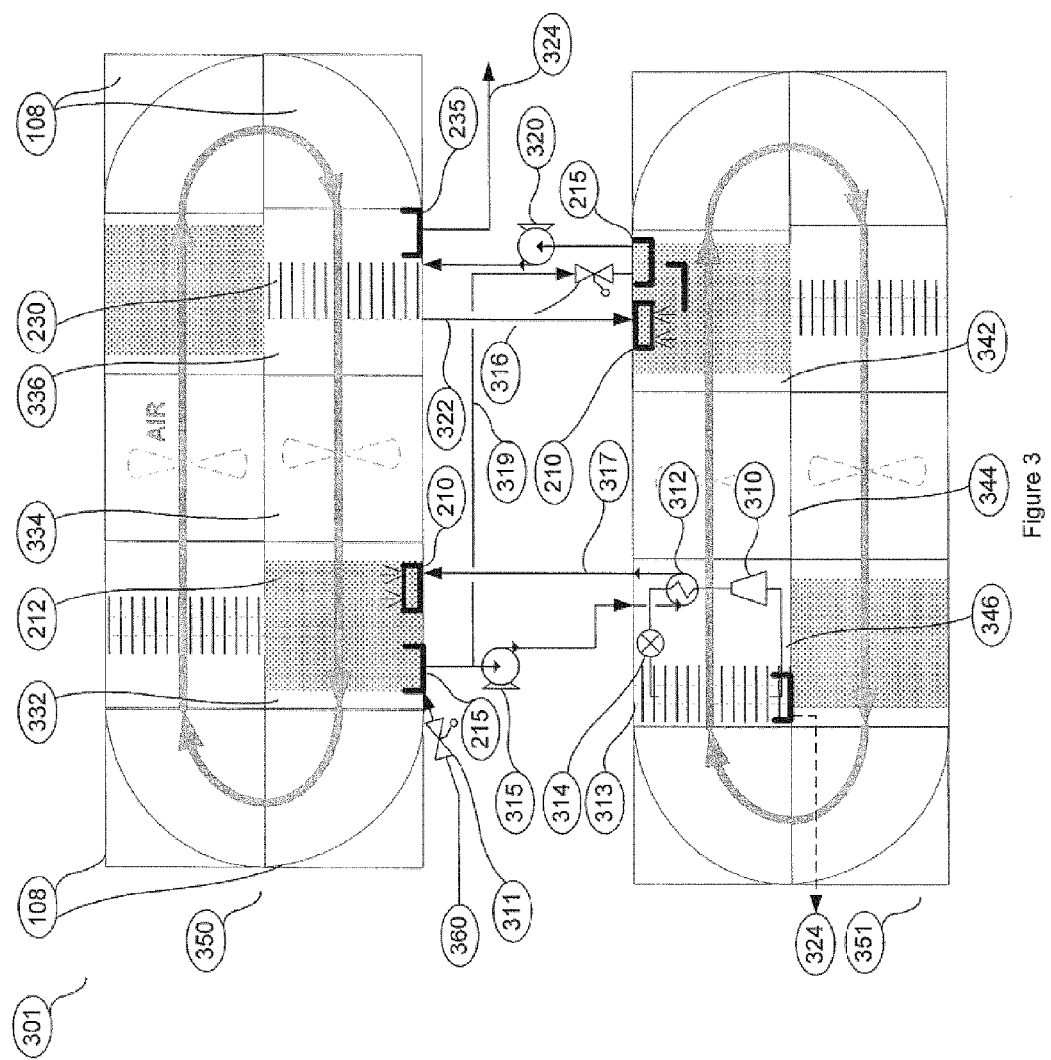
FIG. 3 is a top schematic view of a HDH system with a first effect modular HDH apparatus and a second effect modular HDH apparatus according to an embodiment.

Referring now to FIG. 3, there is shown an embodiment of a HDH system 301 comprising a first effect modular HDH apparatus 350 and a second effect modular HDH apparatus 351 which are thermally coupled to each other. The first effect modular HDH apparatus 350 comprises two rows of modules with a first effect fan module 334 positioned between a first effect humidification module 332 and a first effect dehumidification module 336 in each row. A transition module 108 is positioned at either end of each row to direct the air flow around the corner into the adjacent row. Air normally circulates in one direction through the first effect modules moving between the alternating first effect humidification modules 332 and first effect dehumidification modules 336, such that air exiting each of the first effect humidification modules 332 flows into one of the first effect dehumidification modules 336 and air exiting each of the first effect dehumidification modules 336 flows into one of the first effect humidification modules 332. The air direction may be periodically reversed by reversing fan direction; this may beneficially clean the humidification media 212 and the leading edge surfaces of the condensing heat exchanger 230 by exposing them to alternating wet/dry zones.

The second effect modular HDH apparatus 351 comprises two second effect humidification modules 342, two second effect dehumidification modules 346, two second effect fan modules 344 and four transition modules 108. The modules 342, 346, 344, 108 of the second effect modular HDH apparatus 351 are positioned in the same arrangement as the modules 332, 336, 334, 108 of the first effect modular HDH apparatus 350. In alternative embodiments, the number of modules and their positioning may differ between the first effect HDH apparatus 350 and the second effect HDH apparatus 351. Air normally circulates in one direction through the second effect modules 342, 346, 344, 108 moving between the alternating second effect humidification modules 342 and second effect dehumidification modules 346, however the direction of air circulation may be periodically reversed as discussed above. The air circulating around the first effect modular HDH apparatus 350 is of a higher temperature than the air circulating around the second effect modular HDH apparatus 351.

The HDH system 301 may be used to desalinate a saltwater. In the following exemplary method, exemplary temperatures of the fluids in the system are given in square brackets "[deg C]" and these temperatures are exemplary temperatures only and a person of skill in the art will understand that alternative fluid temperatures may be utilized. A first effect saltwater pump 315 pumps first effect saltwater through a heat pump condenser 312 positioned in the second effect dehumidification module 346. Heated refrigerant [60 deg C] passes through the heat pump condenser 312 and heat is transferred from the refrigerant to the first effect saltwater to heat the first effect saltwater to a temperature [55 deg C] higher than the wet bulb temperature of the air [50 deg C] entering the first effect humidification module 332. Heated first effect saltwater 317 [55 deg C] is pumped to the distribution header 210 of the first effect humidification module 332, where the warm saltwater drips through the humidification media 212 in the first effect humidification module 332. Air flow through the first effect humidification module 332 is induced by the first effect fan module 334. Water and heat evaporates from the warmer saltwater [55 deg C] to the cooler air stream [50 deg C] to produce warm first effect humidified air [52.5 deg C] and cooled concentrated saltwater [53.5 deg C] which collects in the basin 215 of the first effect humidification module 332. The first effect humidified air flows into the first effect dehumidification module 336 where is passes over the condensing heat exchanger 230. The surface temperature [47.5 deg C] of tubes of the heat exchanger 230 is cooler than the wet bulb temperature of the first effect humidified air [52.5 deg C], resulting in condensation of moisture on the surface of the tubes and transfer of the latent heat of condensation to a second effect saltwater which is flowing inside the tubes of the heat exchanger 230. Condensed water [46 deg C] collects in the freshwater basin 235 of the first effect dehumidification module 336 and is discharged from the system as freshwater 324 after optional heat exchange (not shown) with incoming saltwater 360.

Second effect pump 320 pumps second effect saltwater from the basin 215 of the second effect humidification module 342 through the inside of the tubes of the heat exchanger 230 in the first effect dehumidification module 336. As described above, the second effect saltwater is heated as it passes through the tubes as a result of the latent heat of condensation of moisture from the first effect humidified air. The latent heat of condensation is therefore transferred from the first effect to the second effect. The heated second effect saltwater 322 [45 deg C] is pumped into the distribution header 210 of the second effect humidification module 342 and drips through the humidification media 212. Air flow is induced by the second effect fan module 344. The second effect air [40 deg C] entering the second effect humidification module 342 has a wet bulb temperature lower than the heated second effect saltwater 322 [45 deg C], which results in evaporation of water to the air stream to produce second effect humidified air [35 deg C]. The second effect humidified air passes into the second effect dehumidification module 346 and condenses on a second effect condensing heat exchanger 313 which in the embodiment shown in FIG. 3 is part of a heat pump circuit. In alternative embodiments having multiple heat effect HDH modular apparatus as described below, saltwater to be desalinated from a lower temperature effect may flow inside the second effect condensing heat exchanger 313 and heat is transferred from the second effect humidified air to the saltwater to be desalinated before the saltwater to be desalinated passes into the humidification module of the lower temperature effect HDH modular apparatus.

The heat pump circuit comprises the second effect condensing heat exchanger 313, a heat pump compressor 310, condenser 312 and expansion device 314 in fluid flow communication with each other. A refrigerant throttled to a lower pressure by the expansion device 314, flows inside the heat exchanger tubes of the second effect condensing heat exchanger 313. The refrigerant temperature [30 deg C] is lower than the wet bulb temperature of the second effect humidified air [35 deg C], which results in condensation of moisture on the surface of the heat exchanger tubes and transfer of the latent heat of condensation to the refrigerant to evaporate the refrigerant. The heat pump compressor 310 compresses the evaporated refrigerant in order to upgrade the heat captured and discharges the refrigerant at a high pressure and temperature [60 deg C] into the heat pump condenser 312. The condenser 312 condenses the compressed refrigerant and transfers the heat of condensation of the refrigerant to the first effect saltwater in the condenser 312 as described above. The result is that the heat pump removes heat from the second effect humidified air stream in the second effect dehumidification module 346 and upgrades this heat to warm the first effect saltwater before it enters the first effect humidification module 332, thereby reducing or eliminating the system net heat input required to heat the first effect saltwater.

The expansion device 314 may be an expansion valve of any refrigerant expansion device, for example a capillary tube, that lowers the pressure of the refrigerant before it enters the tubes of the condensing heat exchanger 313. Exemplar heat pump compressors include, but are not limited to, standard refrigeration system piston or screw compressors sized to match the heat pump evaporator and condenser operating pressures and flow rates. The condensing heat exchanger 313 is exposed to the second effect humidified air which is less corrosive than salt solution, therefore, exemplar condensing heat exchanger materials may be, coated copper, coated cupric-nickel, aluminum, or titanium. Exemplar coatings include heresite based corrosion inhibiting paints and epoxies. Exemplar refrigerants include, but are not limited to, R410A, R134a, or R245fa for heat pump cycles operating with a condensing temperature greater than 55 deg C. The heat pump condenser 312 is exposed to the corrosive first effect saltwater and therefore should be designed for corrosion resistance. Exemplar heat pump condensers include, but are not limited to, tube-in-tube polyethylene heat exchangers or titanium plate and frame heat exchangers. The heat pump circuit may be loaded and unloaded, or cycled on or off, based on the availability of heat from a heat source (not shown) which may be used to heat the first effect saltwater.

As freshwater evaporates from the saltwater, the volume of saltwater in the HDH system 301 will decrease and the salt concentration of the saltwater will increase. Saltwater make-up 360 is provided to the basin 215 of the first effect humidification module 332 through an optional float valve 311 that opens when the fluid level in the basin is below a predetermined level. A blow down line 319 with an optional float valve 316 is provided for transfer of saltwater from the first effect HDH modular apparatus 350 to the second effect HDH modular apparatus 351 when the level of saltwater in the basin 215 of the second effect humidification module 342 is below a predetermined level. Saltwater make-up and blow down from the higher temperature first effect apparatus 350 to the lower temperature second effect apparatus 351 allows saltwater volumes to be maintained while blowing down salts to the lower temperature effect and an optional downstream crystallization stage (not shown).

In alternative embodiments, the arrangement of the internal modules in the first effect modular HDH apparatus 350 and the second effect modular HDH apparatus 351 may differ to that shown in FIG. 3 provided the first effect humidification modules 332 and the first effect dehumidification modules 336 are alternating within the first effect HDH apparatus 350, and the second effect humidification modules 342 and the second effect dehumidification modules 346 are alternating within the second effect HDH apparatus 351. For example, the second effect fan module 344 and second effect dehumidification module 346 may be integrated into a single double wide module and the heat pump machinery including the compressor 310, the condenser 312, and the expansion device 314 could be built into the integrated fan and humidifier module, with the heat pump machinery protected from the air stream by fan casing 225. In an alternative embodiment, the heat pump circuit need not be included in the HDH system and the first and second effect may be thermally driven by passing the second effect saltwater to be desalinated through the heat exchanger of the first effect dehumidification module. Alternatively, the heat pump circuit may be provided but the second effect saltwater to be desalinated need not be passed through the heat exchanger of the first effect dehumidification module. In an alternative embodiment (not shown) the first effect modular HDH apparatus and/or the second effect modular HDH apparatus is made up of two or more HDH modules as disclosed above in more detail.

The operating temperature of the first and second effect modular HDH apparatus may be adjusted up or down by reducing or increasing moist air discharge by closing or opening an air exhaust vent (not shown) positioned in the gas flow path of modular apparatus. This will enable coarse control of first and second effect air temperature to achieve an operating temperature. Fan and pump speed control may be also be used to finely tune the air temperature in each effect. Controlling the air temperature may also control the temperature of the condensing heat exchanger 230 in the first effect dehumidification module 336 and the second effect condensing heat exchanger 313. Controlling the temperature of the condensing heat exchanger 230 controls the temperature of the heat pump condenser 312 which combined with control of the temperature of the second effect condensing heat exchanger 313, enables control of the refrigerant saturation temperature and refrigerant pressure difference across the heat pump compressor 310. Compressor manufacturers will specify a minimum refrigerant saturation temperature difference or pressure difference across the compressor in order to protect the compressor from damaging liquid refrigerant slugs. From an energy efficiency standpoint, it's preferable to operate the compressor at as low pressure difference as the process and compressor allows. This increases the coefficient of performance (COP) of the heat pump cycle. COP for heat pumps is the ratio of heat power discharged in the condenser to the compressor power, a well know performance parameter known to those skilled in the art of heat pump and refrigeration cycles. By controlling and reducing the temperature difference between the first and second effect as described above, the operator can minimize compressor differential pressure but maintain it above the manufacturer specified minimum. Therefore, the operator can minimize compressor power, maximize COP, and thereby maximize the energy efficiency of the two effect heat pump driven concentrating system.

The HDH system described herein with reference to FIG. 3 uses a first and second effect HDH modular apparatus 350, 351, however in alternative embodiments (not shown) the system may encompass more than two effect HDH modular apparatus. The multiple effect HDH system may include:
 a heat pump circuit associated with the lowest temperature effect apparatus, with refrigerant passing through the condensing heat exchanger of the dehumidification module of the lowest temperature effect apparatus; and a heat pump condenser which heats the saltwater before it passes through the humidification media of the highest temperature effect's humidification module.

Alternatively, or additionally, the saltwater entering the humidification module of a lower temperature effect modular HDH apparatus may be passed through the condensing heat exchanger of the dehumidification module of the next highest temperature effect modular HDH apparatus in order to heat the saltwater to a temperature above the wet bulb temperature of air flowing through the lower temperature effect humidification module.

Saltwater may circulate through each of the multiple effect modular HDH apparatus being further concentrated as it passes through the humidification modules of each apparatus. Valves, such as float valve 316, may be used to transfer the saltwater from a higher temperature effect modular apparatus to a lower temperature effect modular apparatus as described above with reference to FIG. 3. Alternatively, saltwater being concentrated in each modular apparatus may be kept separate and may be circulated back to a bulk tank (not shown) for each apparatus.

One or more of the different effect HDH modular apparatus may be closed to the atmosphere with gas flowing between the internal modules, and optionally inlet and outlet vents enabling the air to be controllably exhausted to or taken in from the atmosphere for temperature control. Alternatively, the HDH modular apparatus may be open to the atmosphere. In one embodiment, the lowest temperature effect HDH modular apparatus is open to the atmosphere and operates at atmospheric temperature, with the remaining higher temperature effect HDH modular apparatus being closed systems such that the air temperature can be maintained above atmospheric temperature.

In an alternative embodiment, there is provided a modular HDH multiple temperature effect apparatus comprising multiple internal modules which are thermally coupled to each other. Each of the internal modules may comprise a different HDH temperature effect including a humidification zone and a dehumidification zone in gas flow communication with each other such that humidified gas (typically humidified air) from the humidification zone flows into the dehumidification zone. The humidification zone includes humidification media and the dehumidification zone includes a dehumidifying radiator. The saltwater to be desalinated is passed through the humidification media transferring moisture to gas (typically air) flowing through the media to produce humidified air. Moisture from the humidified air condenses on the condensing heat exchanger to produce dehumidified air and the latent heat of condensation is transferred to fluid flowing within tubes of the dehumidifying radiator. The fluid flowing within the tubes of the condensing heat exchanger may be saltwater to be desalinated from a lower temperature effect and the latent heat of condensation is transferred to the saltwater before it passes through the humidification media of the lower temperature effect. Alternatively, the fluid flowing within the tubes of the condensing heat exchanger may be a refrigerant which is part of a heat pump circuit used to upgrade the latent heat of condensation as described above. In alternative embodiments, the humidification zone and the dehumidification zone of each temperature effect may be in separate but gas flow connected internal modules, such that there is a gas flow connected humidification module and dehumidification module for each temperature effect.

The module(s) of each temperature effect may be in gas flow isolation from module(s) of the other temperature effects in the HDH modular apparatus, thereby preventing gas (typically air) from module(s) of each temperature effect from passing to the next temperature effect in the modular apparatus. This allows the air temperature of each effect to be set and maintained at a different temperature to the other effects. Dehumidified air from the dehumidification zone of each temperature effect may be transferred to the humidification zone of that effect by a duct or the like which connects the two zones. The air temperature of each effect may be controlled by air inlet vents and air exhaust vents which are associated with each effect.

In an alternative embodiment, the module(s) of each temperature effect may be in gas flow communication with the module(s) of the next temperature effect, such that the gas (typically air) flows between the module(s) of different temperature effects in the HDH module apparatus. The temperature of the dehumidified air from a higher temperature effect may be adjusted before it flows into a lower temperature effect, using for example, air outlet and inlet vents or other means as would be known to a person of skill in the art. The dehumidified air from the dehumidification zone of the lowest temperature effect may be heated by a heater or the like before it flows into the humidification zone of the highest temperature effect or it may be dumped to the atmosphere.

While particular embodiments have been described in the foregoing, it is to be understood that other embodiments are possible and are intended to be included herein. It will be clear to any person skilled in the art that modification of and adjustments to the foregoing embodiments, not shown, are possible.

The invention claimed is:

1. A modular humidification-dehumidification (HDH) apparatus for concentrating a solution, the apparatus comprising a plurality of internal modules coupled to each other and a frame housing the plurality of internal modules, wherein the frame has substantially the same dimensions and structural rating as intermodal shipping containers such that the apparatus is stackable one on top of another, the plurality of internal modules comprising:
   (a) a humidification module comprising humidification media facilitating evaporation of liquid from the solution to gas as the solution passes through the humidification media thereby producing a concentrated solution and a humidified gas; and
   (b) a dehumidification module in gas flow communication with the humidification module, the dehumidification module comprising a condensing heat exchanger for condensing vapour from the humidified gas.

2. The apparatus of claim 1 further comprising a fan for generating gas flow through the plurality of internal modules.

3. The apparatus of claim 2, wherein the fan is configured to generate gas flow in one direction through the plurality of internal modules and to generate gas flow in an opposite direction through the plurality of internal modules.

4. The apparatus of claim 2, wherein the plurality of internal modules further comprises a fan module and the fan is positioned in the fan module.

5. The apparatus of claim 1 further comprising a plurality of seals with each seal positioned between adjacent internal modules to fluidly seal the internal modules to each other.

6. The apparatus of claim 5, wherein the plurality of seals are gas inflatable seals.

7. The apparatus of claim 1 further comprising an air inlet vent for controlled input of air into the plurality of internal modules and an air outlet vent for controlled release of air from the plurality of internal modules.

8. The apparatus of claim 1 comprising two or more humidification modules and two or more dehumidification modules, wherein one of the humidification modules and one of the dehumidification modules make up a first effect and another of the humidification modules and another of the dehumidification modules make up a second effect, whereby the condensing heat exchanger of the dehumidification module of the first effect is configured to receive a second effect solution such that the second effect solution flows inside the condensing heat exchanger of the dehumidification module of the first effect before the second effect solution passes through the humidification media of the humidification module of the second effect and is heated by heat generated from condensation of vapour from the humidified gas on an external surface of the condensing heat exchanger of the dehumidification module of the first effect.

9. The apparatus of claim 8, wherein there are more than two effects and each effect comprises one of the humidification modules in gas flow communication with one of the dehumidification modules, and the condensing heat exchanger of the dehumidification module of a higher temperature effect is configured to receive a solution to be concentrated from a lower temperature effect such that the solution to be concentrated flows inside the condensing heat exchanger of the dehumidification module of the higher temperature effect before the solution to be concentrated passes through the humidification media of the humidification module of the lower temperature effect.

10. A modular humidification-dehumidification (HDH) apparatus for concentrating a solution, the apparatus comprising a plurality of internal modules coupled to each other and a frame housing the plurality of internal modules, wherein the frame has substantially the same dimensions and structural rating as intermodal shipping containers such that the apparatus is stackable one on top of another, and wherein two or more of the internal modules are HDH modules and each HDH module comprises:
   (a) humidification media facilitating evaporation of liquid from the solution to gas as the solution passes through the humidification media thereby producing a concentrated solution and a humidified gas; and
   (b) a condensing heat exchanger in gas flow communication with the humidification media for condensing vapour from the humidified gas thereby producing a dehumidified gas.

11. The apparatus of claim 10, further comprising a fan for generating gas flow through the plurality of internal modules.

12. The apparatus of claim 11, wherein each HDH module further comprises a fan for generating gas flow through the HDH module.

13. The apparatus of claim 11, wherein the fan is configured to generate gas flow in one direction through the plurality of internal modules and to generate gas flow in an opposite direction through the plurality of internal modules.

14. The apparatus of claim 10, wherein the HDH modules are in gas flow communication with each other such that the dehumidified gas from one of the HDH modules flows through the humidification media of another of the HDH modules.

15. The apparatus of claim 14 further comprising a plurality of seals with each seal positioned between adjacent internal modules to fluidly seal the internal modules to each other.

16. The apparatus of claim 15, wherein the plurality of seals are gas inflatable seals.

17. The apparatus of claim 14 further comprising an air inlet vent for controlled input of air into the plurality of internal modules and an air outlet vent for controlled release of air from the plurality of internal modules.

18. The apparatus of claim 10, wherein one or more of the HDH modules is open to the atmosphere such that atmospheric air enters the humidification media and the dehumidified gas is released to the atmosphere.

19. The apparatus of claim 10 comprising a first effect HDH module and a second effect HDH module, wherein the condensing heat exchanger of the first effect HDH module is configured to receive a second effect solution such that the second effect solution flows inside the condensing heat exchanger of the first effect HDH module before the second effect solution passes through the humidification media of the second effect HDH module and is heated by heat generated from condensation of vapour from the humidified gas on an external surface of the condensing heat exchanger of the first effect HDH module.

20. The apparatus of claim 19 comprising more than two HDH modules with each HDH module having a different temperature effect, wherein the condensing heat exchanger of a higher temperature effect HDH module is configured to receive a solution to be concentrated in a lower temperature effect HDH module such that the solution to be concentrated flows inside the condensing heat exchanger of the higher temperature effect HDH module before the solution to be concentrated passes through the humidification media of the lower temperature effect HDH module.

21. The apparatus of claim 1, wherein the plurality of internal modules are compressively coupled to each other within the frame.

22. The apparatus of claim 21 further comprising a compression device for compressing the frame.

23. A modular humidification-dehumidification (HDH) apparatus for concentrating a solution, the apparatus comprising a plurality of internal modules coupled to each other and a frame housing the plurality of internal modules, wherein the frame has substantially the same dimensions and structural rating as intermodal shipping containers such that the apparatus is stackable one on top of another, and wherein the internal modules are individually removable from the frame, the plurality of internal modules comprising:
   (a) a humidification module comprising humidification media facilitating evaporation of liquid from the solution to gas as the solution passes through the humidification media thereby producing a concentrated solution and a humidified gas; and
   (b) a dehumidification module in gas flow communication with the humidification module, the dehumidification module comprising a condensing heat exchanger for condensing vapour from the humidified gas.

24. A HDH system for concentrating a solution comprising a first effect modular HDH apparatus and a second effect modular HDH apparatus, wherein the first effect modular HDH apparatus and the second effect modular apparatus comprise a modular HDH apparatus according to claim 1, and the first effect modular HDH apparatus and the second effect modular HDH apparatus are thermally coupled to each other as a result of at least one of:
   (i) the condensing heat exchanger of the first effect modular HDH apparatus being configured to receive a second effect solution such that the second effect solution flows inside the condensing heat exchanger of the first effect modular HDH apparatus before the second effect solution passes through the humidification media of the second effect modular HDH apparatus, the second effect solution being heated by heat generated from condensation of vapour from the humidified gas on an external surface of the condensing heat exchanger of the first effect modular HDH apparatus;
   (ii) the condensing heat exchanger of the second effect modular HDH apparatus being part of a heat pump circuit, the heat pump circuit further comprising a compressor, a condenser, and an expansion device in fluid flow communication with the condensing heat exchanger of the second effect modular HDH apparatus for flow of a refrigerant therethrough, wherein the condensing heat exchanger of the second effect modular HDH apparatus is configured to transfer heat generated by condensation of vapour from the humidified gas on an external surface of the condensing heat exchanger of the second effect modular HDH apparatus to the refrigerant flowing within the condensing heat exchanger of the second effect modular HDH apparatus to evaporate the refrigerant, the compressor is configured to compress the evaporated refrigerant, the condenser is configured to condense the compressed refrigerant and transfer the heat of condensation of the refrigerant to a first effect solution before the first effect solution passes through the humidification media of the first effect modular HDH apparatus, and the expansion device is configured to expand the compressed refrigerant before the refrigerant enters the condensing heat exchanger of the second effect modular HDH apparatus.

25. The system of claim 24, wherein there are more than two effect modular HDH apparatus and the condensing heat exchanger of a higher temperature effect modular HDH apparatus is configured to receive a solution to be concentrated in a lower temperature effect modular HDH apparatus such that the solution to be concentrated flows inside the condensing heat exchanger of the higher temperature effect modular HDH apparatus before the solution to be concentrated passes through the humidification media of the lower temperature effect modular HDH apparatus.

\* \* \* \* \*